US007710441B2

(12) United States Patent
Campbell et al.

(10) Patent No.: US 7,710,441 B2
(45) Date of Patent: May 4, 2010

(54) SYSTEMS AND METHODS FOR USING MULTIPLE SCANNER FACETS TO WRITE A SCAN LINE OF IMAGE DATA IN AN ELECTROPHOTOGRAPHIC DEVICE

(75) Inventors: Alan S. Campbell, Lexington, KY (US); David B. Langer, Lexington, KY (US); David A. Schneider, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 691 days.

(21) Appl. No.: 11/384,535

(22) Filed: Mar. 20, 2006

(65) Prior Publication Data

US 2007/0216748 A1 Sep. 20, 2007

(51) Int. Cl.
*B41J 2/385* (2006.01)
*B41J 2/47* (2006.01)
*B41J 27/00* (2006.01)

(52) U.S. Cl. ....................... 347/134; 347/239; 347/255; 347/261

(58) Field of Classification Search ................. 347/134, 347/133, 252, 255, 239
See application file for complete search history.

(56) References Cited

U.S. PATENT DOCUMENTS 4,578,689 A 3/1986 Spencer et al.
4,663,523 A 5/1987 Swanberg
5,045,869 A 9/1991 Isaka et al.
5,229,790 A 7/1993 Matsuura et al.
5,374,947 A 12/1994 Takahashi et al.
5,497,181 A * 3/1996 Paoli .......................... 347/133
5,777,659 A * 7/1998 Genovese ................... 347/252
5,929,892 A * 7/1999 Towner et al. ............. 347/255
6,304,731 B1 10/2001 Able et al.
6,459,443 B1 10/2002 Klement et al.

* cited by examiner

*Primary Examiner*—Stephen D Meier
*Assistant Examiner*—Kar Yip

(57) ABSTRACT

An imaging system comprises a laser source for emitting a beam, a photoconductive surface, a scanning device and a controller. The controller designates at least a first part and a second part of each line of image data, corresponding to a first part and a second part of each associated sweep of the beam. The laser source is modulated based upon the first part of the line of image data during the first part of a first one of the associated sweeps of the beam. The laser source is not modulated according to image data for the second part of the first one of the sweeps. During the first part of a second one of the associated sweeps of the beam, the laser source is not modulated based upon image data. However, the laser source is modulated based upon the second part of the line of image data during the second part of the second one of the sweeps.

19 Claims, 6 Drawing Sheets

```
1   XXXXXXXXXXXXXXXXXXXXXXX-------------------------
2   ------------------------XXXXXXXXXXXXXXXXXXXXXXXX
3   XXXXXXXXXXXXXXXXXXXXXXXX------------------------
4   -------------------------XXXXXXXXXXXXXXXXXXXXXXX
```

FIG. 6

```
1   ------------------------XXXXXXXXXXXXXXXXXXXXXXXX
2   XXXXXXXXXXXXXXXXXXXXXXXX------------------------
3   ------------------------XXXXXXXXXXXXXXXXXXXXXXXX
4   XXXXXXXXXXXXXXXXXXXXXXXX------------------------
```

FIG. 7

```
|---------------------SCAN LINE-------------------|
    |----------------IMAGE AREA -------------|
    --|XXXXXXXXX ADJUSTMENT REGION XXXXXXXX|--
```

FIG. 8

```
     XXX|XXXXXXXXXX ADJUSTMENT REGION XXXXXXXXX|XXX

1    XXXXXX----------------------------------------
2    ------XXXXXXXXXXXXXXXXXXXXXXXXXXXXXXXXXXXXXXXX
3    XXXXXXXXXXXX----------------------------------
4    ------------XXXXXXXXXXXXXXXXXXXXXXXXXXXXXXXXXX
5    XXXXXXXXXXXXXXX-------------------------------
6    ---------------XXXXXXXXXXXXXXXXXXXXXXXXXXXXXXX
7    XXXXXXXXXXXXXXXXXXXXXXXX----------------------
8    ------------------------XXXXXXXXXXXXXXXXXXXXXX
9    XXXXXXXXXXXXXXXXXXXXXXXXXXXXXX----------------
10   ------------------------------XXXXXXXXXXXXXXXX
11   XXXXXXXXXXXXXXXXXXXXXXXXXXXXXXXXXXXXXXXX------
12   ----------------------------------------XXXXXX
13   XXX-------------------------------------------
14   ---XXXXXXXXXXXXXXXXXXXXXXXXXXXXXXXXXXXXXXXXXXX
```

SYSTEMS AND METHODS FOR USING MULTIPLE SCANNER FACETS TO WRITE A SCAN LINE OF IMAGE DATA IN AN ELECTROPHOTOGRAPHIC DEVICE

BACKGROUND OF THE INVENTION

The present invention relates in general to electrophotographic devices, and more particularly, to systems and methods for distributing a line of image data across at least two scan lines in a scanning laser beam electrophotographic device.

In electrophotography, an imaging system forms a latent image by exposing select portions of an electrostatically charged photoconductive surface to laser light. Essentially, the density of the electrostatic charge on the photoconductive surface is altered in areas exposed to the laser beam relative to those areas unexposed to the laser beam. The latent electrostatic image thus created is developed into a visible image by exposing the photoconductive surface to toner, which contains pigment components and thermoplastic components. When so exposed, the toner is attracted to the photoconductive surface in a manner that corresponds to the electrostatic density altered by the laser beam. The toner pattern is subsequently transferred from the photoconductive surface to the surface of a print substrate, such as paper, which has been given an electrostatic charge opposite that of the toner.

A fuser assembly then applies heat and pressure to the toned substrate before the substrate is discharged from the apparatus. The applied heat causes constituents including the thermoplastic components of the toner to flow into the interstices between the fibers of the medium and the applied pressure promotes settling of the toner constituents in these voids. The toner solidifies as it cools adhering the image to the substrate.

In a typical laser scanning system, a rotating polygon mirror is used to sweep a laser beam across a photoconductive surface in a scan direction while the photoconductive surface advances in a process direction that is orthogonal to the scan direction. A scan line is written each time a new facet of the polygon mirror intercepts the laser beam. Correspondingly, bitmap image data is communicated to the laser source such that one scan line writes a corresponding line of bitmap image data to the photoconductive surface. The polygon mirror speed is synchronized with the advancement of the photoconductive surface so as to achieve a desired image resolution, typically expressed in dots per inch (dpi), at a given image transfer rate, typically expressed in pages per minute (ppm).

Changes in scanning resolution and/or in the image transfer rate can be accomplished by adjusting the process speed of the photoconductive surface. For example, slowing the photoconductive surface to one half of the full speed image transfer rate without changing the scanning mirror speed can provide double scan line addressability which, ideally, can improve the quality of the image printed on the medium. Additionally, by operating the photoconductive surface and optionally, the scanning mirror, at half speed, greater time is available for fusing operations because the print medium is moving through the device at a slower speed. Relatively longer fusing times are desirable for example, when the print medium is relatively thick or where transparencies are used. As another example, print resolution maybe changed by modifying the scanning mirror speed while printing at the same image transfer rate.

Modifying the process speed and/or the polygon mirror speed also often requires a drastic change in laser power to compensate for the changing printing characteristics. For example, to operate satisfactorily at one half of the full speed (normal) image transfer rate, and to maintain double line addressability, e.g., by maintaining the normal scanning mirror speed, the laser power needs to be reduced by one half of the full speed laser power so as to maintain output image consistency between full speed and half speed image transfer modes of printing. Unfortunately, the operating range of a typical laser diode may not allow such drastic changes in laser output power. As such, the prior art has attempted to reduce laser power output by using pulse width modulation of a full power laser beam such that the power output by the laser is reduced by one half. However, pulse width modulating a laser beam increases the complexity of the laser diode driver circuitry. Moreover, changing the duty cycle of a laser beam affects the “turn on” and “turn off” characteristics of the laser, which may affect overall consistency and print quality.

SUMMARY OF THE INVENTION

An imaging system for an electrophotographic device comprises a laser source, a photoconductive surface, a scanning device and a controller. The scanning device has a plurality of deflecting surfaces arranged such that a beam emitted by the laser source sweeps in a scan direction across the photoconductive surface each time a new one of the deflecting surfaces intercepts the beam. The controller designates at least a first part and a second part of each line of image data corresponding to at least a first part and a second part of each associated sweep of the beam across the photoconductive surface. For each designated part of the line of image data, there is an associated sweep of the beam. Accordingly, if a line of image data is designated by two parts, there will be two associated sweeps of the beam to write that line of image data to the photoconductive surface.

For each line of image data, the controller causes the laser source to be modulated based upon the first part of the line of image data during the first part of a first one of the associated sweeps of the beam. The laser source is not modulated according to image data for the second part of that sweep of the beam. Correspondingly, the controller causes the laser source to be modulated based upon the second part of the line of image data during the second part of a second one of the associated sweeps of the beam. However, the laser source is not modulated based upon image data for the first part of that sweep of the beam. Accordingly, the first part and the second part of each line of image data can be written in either order.

A method of operating an electrophotographic device comprises sweeping a beam emitted by a laser source across an image area of a photoconductive surface defining a scan line for each sweep, designating at least a first part and a second part of each line of image data, corresponding to a first part and a second part of each associated sweep of the beam across the photoconductive surface and writing each line of image data to the photoconductive surface such that each line of image data is split across at least two scan lines. To write each line of image data, the laser source is modulated based upon the first part of the line of image data during the first part of a first one of the associated sweeps of the beam and the laser source is not modulated according to image data during the second part of that sweep. The laser source is modulated based upon the second part of the line of image data during the second part of a second one of the associated sweeps of the beam. However, the laser source is not modulated according to image data during the first part of that sweep of the beam. Accordingly, the first part and the second part of each line of image data can be written in either order. Moreover, each line of image data may be designated by more than two parts.

Under such an arrangement, for each designated part of the line of image data, there is an associated sweep of the beam.

A method of varying image transfer characteristics of an electrophotographic device comprises providing a laser source, providing a photoconductive surface and providing a rotating scanning device having a plurality of deflecting surfaces arranged such that a beam emitted by the laser source sweeps in a scan direction across the photoconductive surface each time a new one of the deflecting surfaces intercepts the beam. A first mode of operation comprises causing the laser source to write image data to the photoconductive surface such that each line of image data is written in a corresponding sweep by a single deflecting surface of the scanning device. A second mode of operation comprises causing the laser source to write image data to the photoconductive surface such that each line of image data is split across at least two deflecting surfaces of the scanning device.

One exemplary method of splitting the scan line across at least two deflecting surfaces when operating in the second mode comprises designating at least a first part and a second part of each line of image data, corresponding to a first part and a second part of each associated sweep of the beam across the photoconductive surface. The laser source is modulated based upon the first part of the line of image data during the first part of a first one of the associated sweeps of the beam and is not modulated according to image data for the second part of that sweep of the beam. The laser source is modulated based upon the second part of the line of image data during the second part of a second one of the associated sweeps of the beam. However, the laser source is not modulated based upon image data for the first part of that sweep of the beam. Accordingly, the first part and the second part of each line of image data can be written in either order. Moreover, each line of image data may be designated by more than two parts. Under such an arrangement, for each designated part of the line of image data, there is an associated sweep of the beam.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which:

FIG. 6 is a schematic representation of an approach for writing scan lines across a photoconductive surface;

FIG. 7 is a schematic representation of an alternative approach to writing scan lines across a photoconductive surface;

FIG. 8 is a schematic illustration of a scan line across a photoconductive surface, and a conceptual delineation of an adjustment region within an image area of the scan line;

FIG. 9 is a schematic representation of yet another approach to writing scan lines across a photoconductive surface using a random incremental step; and FIG. 10 is a schematic representation of yet another approach to writing scan lines across a photoconductive surface by avoiding the positioning of a step at an image data boundary between an "ON" print element (Pel) and an "OFF" Pel.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

An Exemplary Electrophotographic Imaging Apparatus

Figure 1:
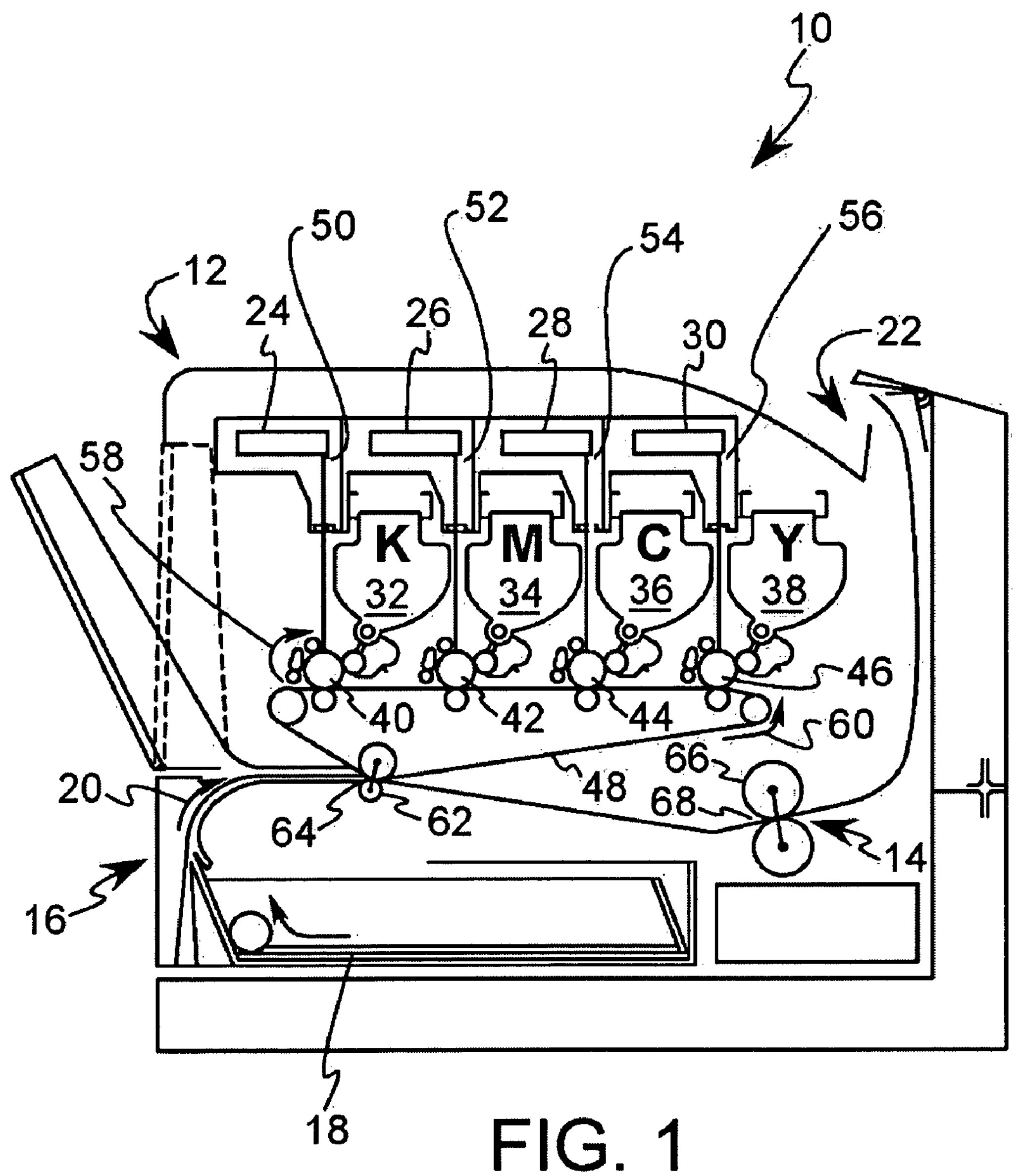
FIG. 1 is a side schematic view of an exemplary electrophotographic imaging apparatus.

Referring now to the drawings, and particularly to FIG. 1, an electrophotographic device is illustrated in the form of a color laser printer 10. The printer 10 includes an imaging section 12, a fusing section 14 and a paper path 16. A sheet of print media 18 is transported from a tray or other feed source along the paper path 16 in the direction of the arrow 20 so as to pass the imaging section 12. At the imaging section 12, cyan, yellow, magenta and/or black toner patterns (CYMK) may be registered to form a mono or color image, which is transferred to the print media 18.

The imaging section 12 includes four printhead units 24, 26, 28, 30, four toner supplies 32, 34, 36, 38, four photoconductive drums 40, 42, 44, 46 and an intermediate transfer belt 48. Printhead unit 24 generates a laser beam 50 that is modulated in accordance with bitmap image data corresponding to the black color image plane to form a latent image on the photoconductive drum 40. Printhead unit 26 generates a laser beam 52 that is modulated in accordance with bitmap image data corresponding to the magenta color image plane to form a latent image on the photoconductive drum 42. Printhead unit 28 generates a laser beam 54 that is modulated in accordance with bitmap image data corresponding to the cyan color image plane to form a latent image on the photoconductive drum 44. Similarly, printhead unit 30 generates a laser beam 56 that is modulated in accordance with bitmap image data corresponding to the yellow color image plane to form a latent image on the photoconductive drum 46.

Each photoconductive drum 40, 42, 44, 46 continuously rotates clockwise (as shown) according to the directional arrow 58 past their associated toner supply 32, 34, 36, 38 such that toner is transferred to each photoconductive drum surface in a pattern corresponding to the latent image formed thereon. The corresponding toner patterns are transferred to the surface of the intermediate transfer belt 48 as the belt 48 travels past each photoconductive drum 40, 42, 44, 46, as indicated by the directional arrow 60. The timing of the laser scanning operations on each of the photoconductive drums 40, 42, 44, 46, the speed of the intermediate transfer belt 48 and the timing of the travel of the print media 18 along the paper path 16 are coordinated such that a forward biased transfer roll 62 transfers the toner patterns from the belt 48 to the print media 18 at the nip 64 so as to form a mono or composite color toner image on the print media 18.

The print media 18 is then passed through a fuser 66 at the fusing section 14. The fuser 66 includes a nip 68 that provides heat and pressure to cause the toned image to adhere to the print media 18. After fusing, the print media 18 is discharged from the printer 10 along the media discharge path 22.

Figure 2:
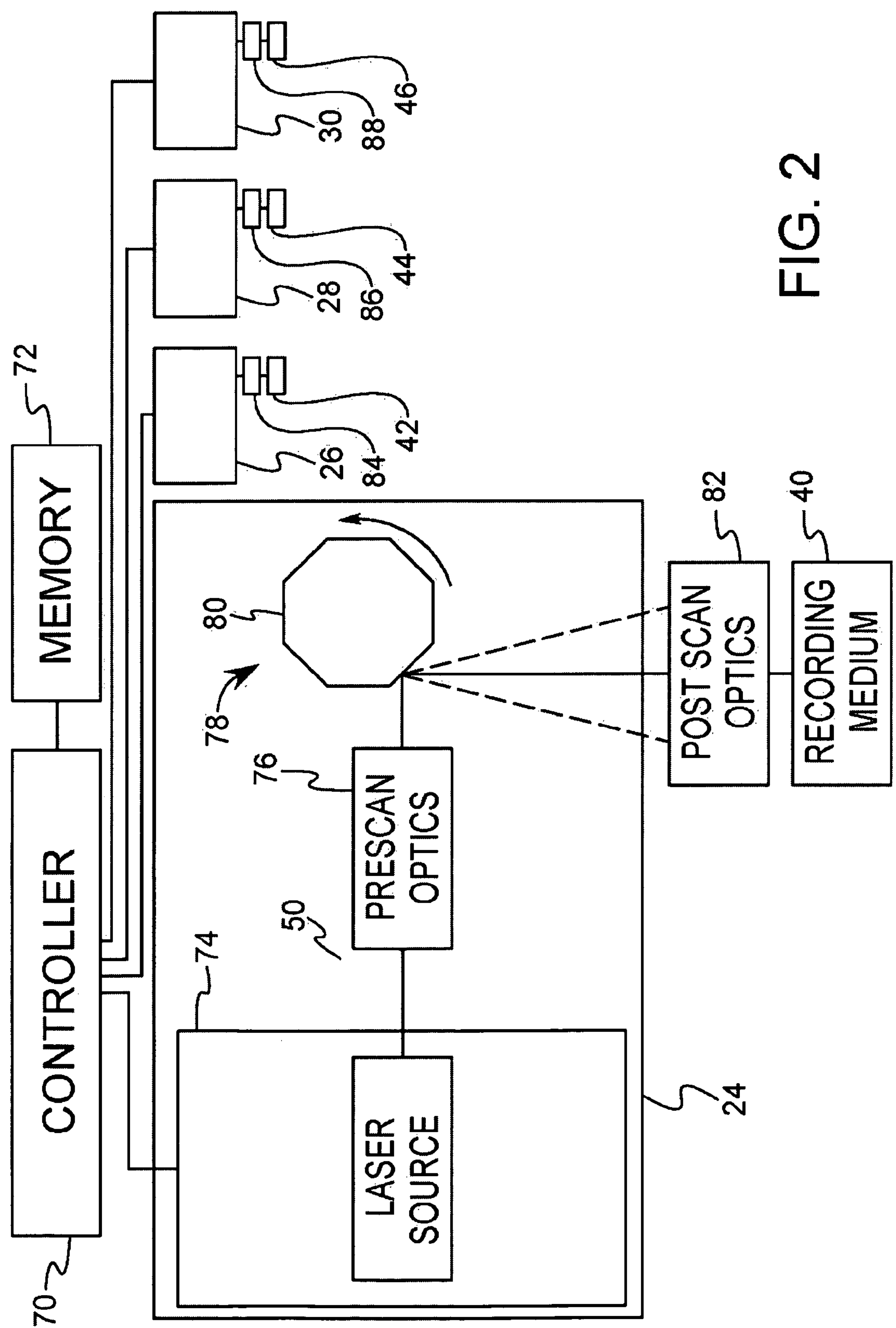
FIG. 2 is a schematic representation of the controller and four printheads of the electrophotographic imaging apparatus of FIG. 1.

Referring now to FIG. 2, an exemplary imaging system includes a controller 70, memory 72 and four laser scanning sections. The controller 70 converts image data stored in memory 72 into a format suitable for imaging. For color operation, the image to be printed is de-constructed into four bitmap images, each corresponding to an associated one of the cyan, yellow, magenta and black (CYMK) image planes, e.g., by the main system controller 70 or by the external device. Each of the CYMK bitmap images is communicated to an associated one of the laser scanning sections.

Each laser scanning section is similar, and as such, only one laser scanning section will be described in detail. A first one of the laser scanning systems includes a laser source 74, e.g., a laser diode associated with the black image plane, for generating the laser beam 50, pre scan optics 76, a scanning device having a plurality of deflecting surfaces, e.g., a polygon mirror 78 having a plurality of facets 80, and post scan optics 82. The bitmap image data, corresponding to the black color image plane is optionally converted into corresponding laser modulation data, which is communicated to laser source 74. The beam 50 emitted by the laser source 74 passes through the pre-scan optics 76, which may comprise one or more collimating lenses, pre-scan lenses and/or other optical system components as the specific implementation requires to direct and focus the modulated beam 50 towards the polygon mirror 78. The polygon mirror 78 is controlled to rotate at a fixed rotational velocity (ω) during imaging operations such that the facets 80, e.g., eight facets as shown, reflect the laser beam 50 through post scan optics 82 so as to sweep generally in a scan direction across the photoconductive surface of the drum 40 each time a new one of the facets 80 intercepts its associated beam 50. The post scan optical components may be provided to direct and/or focus the beam and may be provided as part of the printhead 24 and/or such components may be otherwise mounted within the apparatus 10.

The above-described apparatus is merely illustrative and other device configurations may alternatively be implemented. For example, the photoconductive drums 40, 42, 44, 46 may be replaced with a photoconductive belt or other photoconductive surface(s). Moreover, the photoconductive surface(s) may transfer the toned image directly to the print media 18, or to a different intermediate configuration that subsequently carries the toned image to the print media 18. As another example, a single photoconductive surface may be used to image each color plane in sequential processing steps. Also, while a plurality of printheads 24, 26, 28, 30 are illustrated, a single printhead may alternatively be provided for generating each of the laser beams 50, 52, 54, 56. Thus, although FIGS. 1-2 illustrate an exemplary apparatus, other imaging system configurations may alternatively be implemented.

Figure 3:
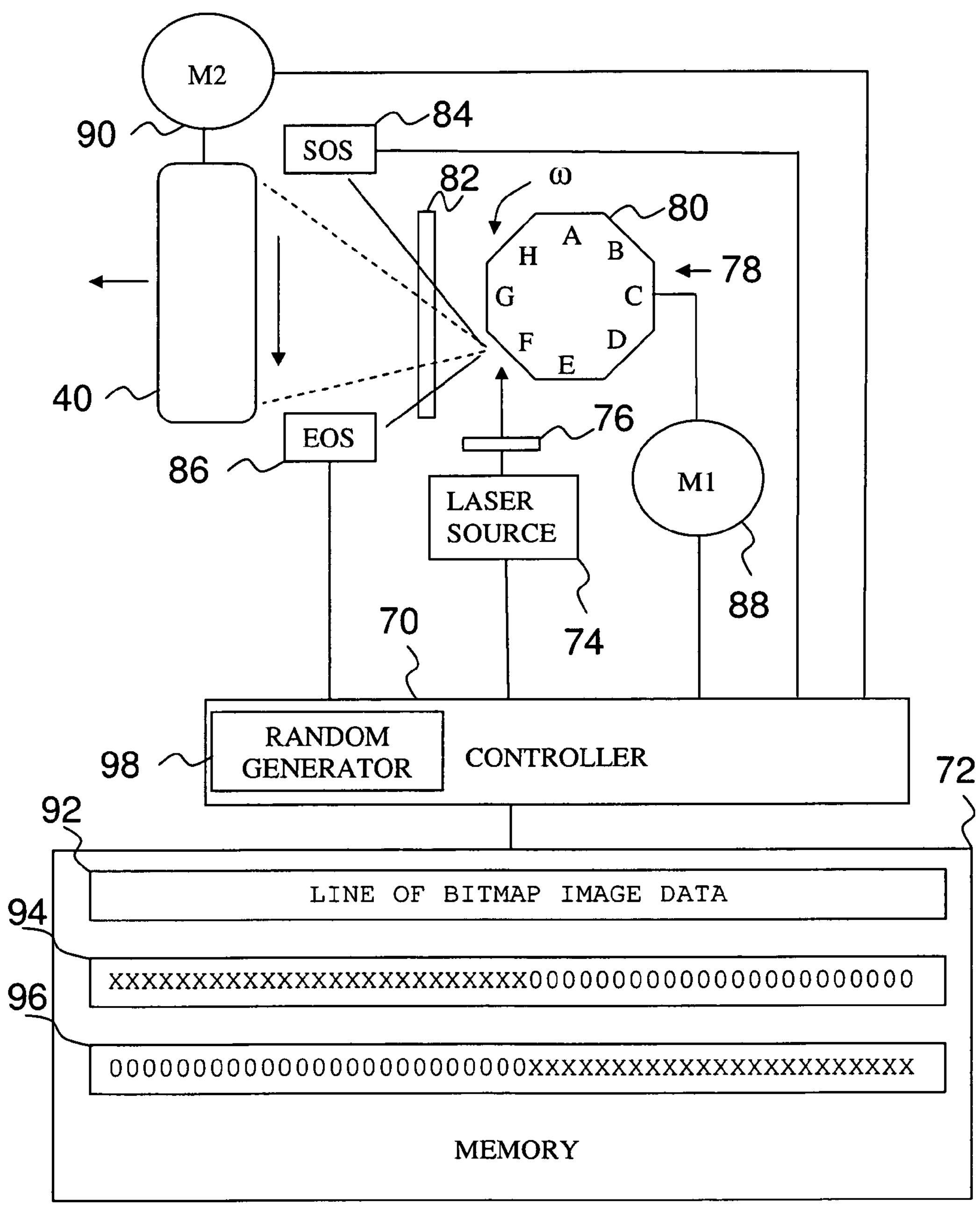
FIG. 3 is a schematic representation of an imaging system of the electrophotographic imaging apparatus of FIG. 1.

With reference to FIG. 3, each time a facet 80 of the polygon mirror 78 intercepts the beam 50, a new scan line is generated, which may be used to write image data to the photoconductive surface of the drum 40. In order to ensure that the imaging system timing is appropriate for the particular printing application, a horizontal synchronization signal (Hsync signal) may be generated to indicate that the laser beam is about to sweep across the image area of a corresponding photoconductive surface. For example, when the beam 50 reaches a start of scan location along its scan path, e.g., at the beginning of a sweep for a given facet of rotation of the polygon mirror 78, the beam 50 is directed to a first sensor 84 which triggers the Hsync signal. The timing of this event is referred to hereinafter as Start of Scan (SOS) and designates the start of a scanning operation for the beam 50. A pick off may also occur generally towards the end of a sweep for a given facet of rotation, e.g., using a second sensor 86, mirror or other suitable device. The timing of this event is referred to hereinafter as End of Scan (EOS) and designates that the beam 50 has swept past an end of the image area of the corresponding photoconductive surface of the drum 40.

The scan line thus includes a non-imaging section wherein the laser beam is outside of an image area of its corresponding photoconductive surface, and an imaging section wherein the laser beam is within the image area of its photoconductive surface. During the SOS and EOS detection, the laser beam 50 is in the non-imaging section(s) of the scan, outside the image area of its photoconductive surface of the drum 40. The SOS/EOS can be detected in any number of ways, e.g., two sensors may be used including a first sensor for SOS and a separate sensor for EOS or a single SOS/EOS sensor may be used, e.g., using suitable pick-off mirrors and/or other optical devices. Still further, the SOS and EOS sensor(s) may be located in any suitable locations, including areas associated with the printhead 24 or areas outside of the printhead, e.g., adjacent to a corresponding photoconductive surface of the drum 40.

The controller 70 sets the rotational velocity of the polygon 80 by controlling a suitable drive device 88 such as a motor. Similarly, the controller 70 sets the process direction speed of the drum 40 by controlling a suitable drive device 90 such as a motor. The controller 70 further controls the communication of bitmap image data (which may have been converted to suitable laser modulation data) to the printhead 24, 26, 28, 30 such that the apparatus 10 operates at a desired image transfer rate (usually expressed in pages per minute) at a desired process direction resolution (typically expressing in dots per inch).

According to various aspects of the present invention, the process direction print resolution may be determined by distributing a single line of image data across at least two scan lines written to the photoconductive surface of the drum 40. As schematically illustrated, the controller 70 interacts with image data stored in memory 72. For each line of image data 92, the controller 70 generates at least two scan lines of laser modulation data by splitting the line of image data up so as to be written on at least two separate scan lines. As an example, the line of bitmap image data 92 is split into two lines of laser modulation data 94, 96. Each line of laser modulation data 94, 96 will be written along a unique scan line. Thus, at least two facets 80 of the polygon mirror 78 are utilized to write each line of image data where each of the at least two facets 80 writes at least a part of an associated line of image data.

Because a single line of image data 92 is split into two scan lines of laser modulation data 94, 96, there will be a step where the image data breaks across its two (or more) associated scan lines. Accordingly, the controller 70 may implement rules or algorithms for minimizing the visual perception of the step. One way of minimizing the effects of the step is to randomly position the step for different lines of image data. As such, the controller 70 may contain a random generator 98, which may be implemented in hardware or software. The step and selection of the step location are described in greater detail below.

Figure 4:
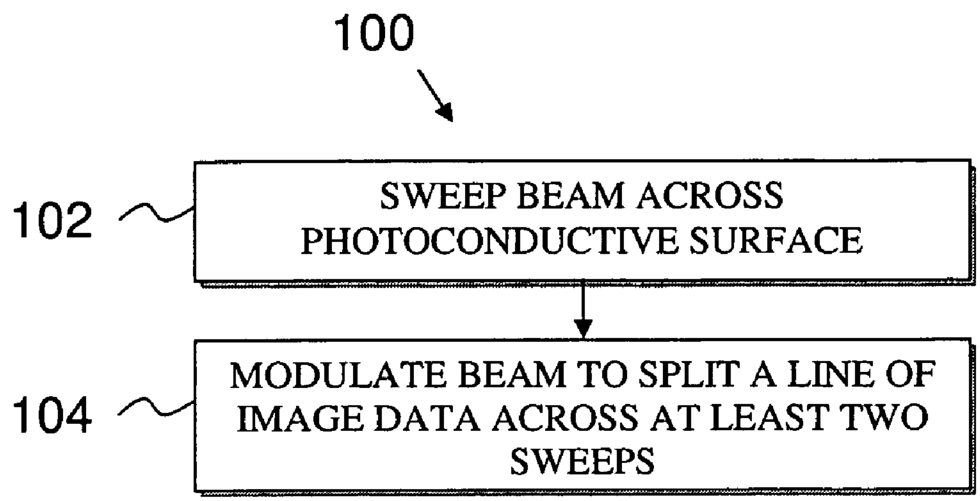
FIG. 4 is a flow chart of a method for operating an electrophotographic device.

Referring to FIG. 4, a method 100 for operating an electrophotographic device comprises sweeping a beam emitted by a laser source across an image area of a photoconductive surface, thus defining a scan line for each sweep of the beam at 102 and modulating the beam so as to write a line of image data across at least two sweeps of the beam at 104.

Figure 5:
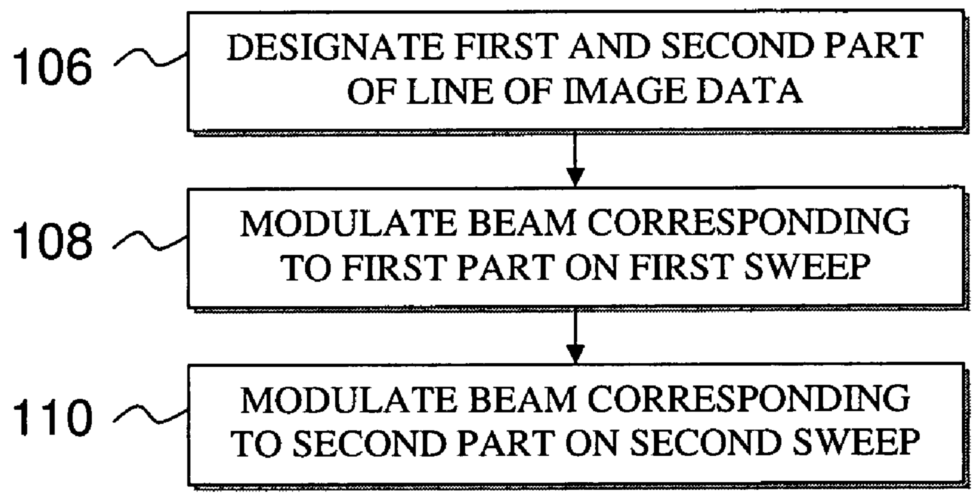
FIG. 5 is a flow chart of an exemplary method of splitting a scan line across at least two sweeps of a scanning laser beam.

Referring to FIG. 5, one exemplary approach for writing a line of image data across two sweeps comprises designating at least a first part and a second part of a line of image data, corresponding to a first part and a second part of each associated sweep of the beam across the photoconductive surface at 106.

The laser source is modulated based upon the first part of the line of image data during the first part of a first one of the associated sweeps of the beam and is not modulated according to image data for the second part of the first one of the associated sweeps of the beam, thus writing a first scan line at 108. The laser source is not modulated based upon image data during the first part of a second one of the associated sweeps of the beam and is modulated based upon the second part of the line of image data during the second part of the second one of the associated sweeps of the beam thus writing a second scan line at 110. The first part of the line of image data may be written sequentially in the first of two corresponding sweeps, or in the second of two corresponding sweeps. The controller 70, which is illustrated with reference to FIGS. 1-3, may be used to implement the method 100.

As an example, the polygon mirror 78 shown in FIG. 3 has eight facets 80, which are identified as facets A, B, C, D, E, F, G, H for purposes of illustration. Each line of image data written to the photoconductive drum may be split across two or more scan lines. As schematically illustrated in FIG. 6, the controller 70 designates at least a first part and a second part of each line of image data, corresponding to a first part and a second part of each associated sweep of the beam across the photoconductive surface, i.e., a first part and a second part of each scan line within the image area of the photoconductive surface. A first one of the parts of the line of image data is written by the first scan line and a second one of the parts of the line of image data is written by the second scan line.

Assume that scan line 1 is written by facet A and scan line 2 is written by facet B. Further, assume that the laser sweeps left to right and that the first part of the line of image data extends from the first written Pel starting at the left margin (Pel 1) to some determined Pel position within the image area of the photoconductive surface (Pel m). The second part of the line of image data extends from Pel m+1 to the last written Pel at the right margin (Pel n) of the image area of the photoconductive surface.

The laser source is modulated based upon the first part of the line of image data during a first sweep of the beam corresponding to the first scan line swept by facet A. The laser source is not modulated according to image data, e.g., turned off, for the second part of the first scan line. Thus, only Pel 1 to Pel m are written along scan line 1. Moreover, Pel 1 to Pel m are written within the first part of the first scan line. This is schematically represented in FIG. 6 by an X representing that for the first part of scan line 1, the laser beam is modulated on and off according to the corresponding image data. Similarly, the dash "-" in the second part of scan line 1 designates that the laser source 74 is not modulated according to image data, e.g., that the laser is turned "OFF".

The laser source is further modulated based upon the second part of the line of image data during a second sweep of the beam corresponding to the second scan line swept by facet B. However, the laser source is not modulated according to the image data, e.g., the laser beam is turned off, for the first part of the second scan line. Thus, only Pel m+1 to Pel n are written along scan line 2. Moreover, Pel m+1 to Pel n are written in the second part of scan line 2. This is schematically represented in FIG. 6 by the dash "-" in the first part of scan line 2 designating that the laser source 74 is not modulated according to image data, e.g., that the laser is turned "OFF". Similarly, an X represents that for the second part of scan line 2, the laser beam is modulated on and off according to the corresponding image data. As such, the scan direction position of each Pel in a line of image data is not affected by splitting the line of image data across two or more facets 80 and facets 80 A and B each contribute to write the first line of image data.

Continuing with the above-example, assume that scan line 3 is written by facet C and that scan line 4 is written by facet D. The first part of a second line of image data is written on the first part of scan line 3 and the laser beam is not modulated during the second part of scan line 3. Similarly, the laser is not modulated for the first part of scan line 4 and is modulated along the second part of scan line 4 according to the second part of the second line of image data. The above-pattern repeats for facet pairs E-F and G-H.

As another example, with reference to FIG. 7, assume that scan line 1 is written by facet A and scan line 2 is written by facet B. Further, assume that the laser sweeps left to right as with the above example. Again, a first line of image data is written to the imaging area of the photoconductive surface using scans from two facets 80, e.g., from facets 80 A and B. However, as illustrated, the first one of the sweeps writes the second part of the line of image data and the corresponding laser is not modulated for the first part of scan line 1. Similarly, the second one of the sweeps writes the first part of the line of image data in the first part of scan line 2, and the laser is not modulated according to image data for the second part of scan line 2.

The above-pattern repeats for facet pairs C-D, E-F and G-H. Thus, the second part of the line of image data is written to the photoconductive surface before the first part of the same line of image data. The approaches set out with reference to FIGS. 6 and 7 may be implemented with laser systems that scan left to right or right to left.

In the above-described arrangements, every facet 80 of the polygon mirror 78 is utilized. However, two (or more) facets 80 are utilized per line of image data. As such, without changing the rotational velocity (ω) of the polygon mirror 78 78, and without changing the process direction velocity of the corresponding photoconductive surface of the drum 40, the process direction resolution of a printed document is effectively modified relative to the normal process direction resolution. For example, the process direction resolution can be reduced 50% by splitting each line of image data across two facets 80.

As shown in FIGS. 6 and 7, there is a "step" in the line of image data written to the photoconductive surface of the drum at the position where the image data switches from a first scan line to an adjacent scan line. This step is referred to herein as the step position, and will generally be located at a predetermined Pel position. However, various aspects of the present invention are not limited to using two scan lines to write a single line of image data. Rather, in general, there will be n−1 steps in the line of image data written to the photoconductive surface of the drum 40 where n corresponds with the number of facets 80 used to write the single line of image data.

In certain circumstances, this "step" may be ignored. For example, the step resolution may be small or otherwise close to the size of the Pels written to the photoconductive surface. If the process direction resolution is nominally 1200 dpi and it is desired to realize a nominal resolution of 600 dpi, such as by utilizing two scan lines per line of image data, then a process direction step size of $1/1200^{th}$ of an inch (21.1 micrometers) will be created at a predetermined step position, e.g., a print element location somewhere in the image area of the photoconductive surface of the drum where the line of image data switches facets 80. Depending upon factors such as the particular toner pattern being written and the visual acuity of the viewer, the step may not be detrimental to perceived print quality.

In order to minimize the visual perception of the step in the line of image data, the scan direction position of the step can be shifted while imaging. In general, the duty cycle, i.e., percentage or part of the scan line that the laser beam is active writing image data, can vary so long as the sum of the duty cycles of facets 80 utilized to write a given line of image data is 100%. In the inactive part of each scan line, the corresponding laser beam is not modulated, e.g., set to an off state.

Keeping with the above example of dividing each line of image data across two scan lines, the polygon mirror 78 may be conceptually divided into odd facets 80 A, C, E, G and even facets 80 B, D,F, H, where the duty cycle of even facets 80 is M % and the duty cycle for odd facets 80 is N %. M and N are chosen such that M %+N %=100%. For example, if 50% of facet A is used to write a line of image data, then the remainder of the line of image data may be written using 50% of facet B. This corresponds to locating the step position in the center of the corresponding line of image data. Thus, assume that the scan direction resolution is 1200 dpi and that the image area is 10,200 Pels in the scan direction. The step position may be located approximately at print element 5,100 from the starting Pel. Thus, the first part of the image data and corresponding sweep is delineated on a first side of the step, e.g., Pel 1 through Pel 5,100 and the second part of the image data and corresponding sweep is delineated on a second side of the step position opposite said first side, e.g., Pel 5,101 through 10,200.

Similarly, if 35% of facet C is used to write a line of image data, then 65% of facet D may be used to write the remainder of the line of image data. Thus, assume that the scan direction resolution is 1200 dpi and that the image area is 10,200 Pels in the scan direction. The step position is located approximately at print element 3570 from the starting Pel.

Assuming that the values of M and N are constant over a number of lines of image data, e.g., M=50% and N=50%, then the step will be at the same scan direction position for each of those scan lines. However, the values of M and N can be varied over the lines of image data (pairs of scan lines) so that the scan direction step position shifts.

There are a number of ways to vary the step position. One exemplary approach for varying the step position is to randomly vary the value of the duty cycle of M (or N) for each facet pair (even and odd facet) such that for each line of image data, M %+N %=100%. The random variations of the step location may be determined for example, using the random generator 98 associated with the controller 70 as shown in FIG. 3. Moreover, a rule may require that the random location be positioned within a predetermined region of the scan line. For example, with reference to FIG. 8, a scan line includes an image area portion corresponding to a section of the scan line wherein the corresponding laser beam is over the image area of the associated photoconductive surface of the drum. Within at least a subsection of the image area, an adjustment region may conceptually be defined. The adjustment region may thus encompass a portion of the scan line, or the entirety of the scan line within the image area of the photoconductive surface.

As an example, assume that the adjustment region is conceptually 80% of the image area and is centered with respect to the image area. The value of M (or N) can vary from 10% to 90% of the scan direction length of the image area. Keeping with the above examples, assume that the image area of the scan line is 10,200 print elements. The adjustment region for selecting the step may occur randomly anywhere between print element 1020 and print element 9180.

Another exemplary rule is illustrated with respect to FIG. 9. As illustrated, the step position for each line of image data is based upon a randomized incremental step location determination. That is, the step will always move in a predetermined direction, e.g., to the right or to the left, until the end of the adjustment region is reached. After reaching the end of the adjustment region, the step position of the next line of image data is wrapped back to the beginning of the adjustment region.

Thus, the step position can be determined for each line of image data by defining a step range within an image area of the photoconductive surface having a first end and a second end. A step position is randomly selected along each line of image data delineating a first part of the line of image data from a second part of the line of image data such that the step position is a random distance in a predetermined direction from the first end towards the second end relative to an immediately previous step position. The step position is wrapped back towards the first end if the randomly selected position would exceed the location of the second end.

Referring to FIG. 10, the step location may be based upon a pattern specific determination. For example, the step may occur within a pattern such as a fill region. Thus, the step typically does not occur on a boundary between ON and OFF Print elements. Rather, by taking advantage of knowledge of the image data, the step location can be located where adjacent print elements (in the process and/or scan directions) are either white or fill. As an example, in FIG. 10, the value "1" indicates image data designating that the beam is turned ON. A value of "0" indicates image data designating that the beam is turned off. A dash "-" designates that the beam is not modulating image data, e.g., the beam is turned off. As shown, the step between scan lines 1 and 2 may occur with ON Print elements to either side of the step, as schematically illustrated by the laser value 1 to either side of the step. As another example, in scan lines 3 and 4, the step occurs within a region of Off print elements. The step location may be arbitrarily or randomly positioned along the scan line subject to the constraint that, where possible based upon the image data, the step position does not occur on a boundary, e.g., a 1 on one side of the step and a 0 on the opposite side of the step as set out above. The choice of the step location may also consider the value of Pels in the process direction. Thus a step location may be selected upon a neighborhood or surrounding region of Pels.

Other patterns and approaches can be utilized to write a line of image data using multiple scan lines. Moreover, the above and other approaches may be combined or modified based upon a number of performance factors including processing efficiency, perceived need for mitigating the step and based upon knowledge of the content of the image data stored in memory. For example, for a given set of scan lines where the step in the image data occurs in a pattern, it may be that a step position must occur on a boundary due to the content of the image data.

With reference to FIGS. 3 through 10 in general, the manner in which each line of image data is broken up and is split across multiple scan lines may affect the manner in which the controller 70 interacts with the image data. For example, in the exemplary arrangement of FIG. 7, the second part of the image data is actually written a scan line ahead of the first part of the line of image data. As such, the controller further includes a process for determining where to locate the step position for each line of image data, but also, to determine the order in which image data is read out of memory to be communicated to the laser source, and to set the system timing to correspond the appropriate image data to the appropriate scan line.

The above examples are presented by way of illustration and not by way of limitation. For example, a line of image data may be written in a different pattern from that illustrated in and described with reference to the figures herein. Also, the line of image data need not be split in or about the middle of the scan line. A line of image data may be split across any number of scan lines and need not utilize adjacent facets 80 to split the line of image data.

Multiple Speed Operation

In general, the image transfer rate of an electrophotographic device defines a speed in which a toner image is transferred from the photoconductive surface to an associated image transfer device. The image transfer device may comprise for example, the intermediate transfer belt 48 described with reference to FIG. 1, a transport belt that transports a print media directly past the photoconductive surface, or any other structure for transporting the print media or for transferring the toner patterns from the photoconductive surface to the print media. Additionally, the photoconductive surface is not limited to the photoconductive drums 40, 42, 44, 46 shown in FIG. 1, and may include for example, photoconductive belts or other structures.

Moreover, it is desirable in certain electrophotographic devices to provide two or more image transfer rates to support different modes of operation. Relatively slower image transfer rates generally result in the print media moving more slowly through the device, which may promote better fusing operations, e.g., to achieve translucence of color toners fused onto transparent media, or improve adherence of toner when printing thick, gloss or specialty papers. One approach is to slow down the image transfer rate by slowing down the intermediate transfer belt 48 and correspondingly slowing down the photoconductive drums 40, 42, 44, 46 and the associated transport of the print media 18. When slowing down the image transfer rate, either the laser output power, the rotational velocity of the polygon mirror 78, or both may be adjusted down in corresponding amounts to compensate for the new image transfer rate.

A typical laser diode is not always adjustable to accommodate large variations in laser output power. For example, laser power adjustments over a wide range may result in spurious mode-hopping as the laser current approaches the laser power threshold for lasing. Moreover, the laser power must not exceed a specified maximum laser drive current level. Also, relatively large changes in laser power can affect the overall print quality due to changes in laser turn-on and turn-off timing. Relatively large variations in polygon motor velocity can also affect print quality, such as by causing jitter and otherwise unstable rotational velocity of the polygon mirror 78. However, the speed of a typical motor that is used to drive a photoconductive drum 40, e.g., motor 90 shown in FIG. 3, may be adjusted over a range of approximately 3:1 and still maintain a robust phase lock to maintain a relatively constant rotational velocity.

Referring back to FIG. 3, if the process direction speed of the photoconductive surface of the drum 40 is cut in half, e.g., by using the controller 70 to cut the speed of the drive device 90 by 50%, and the drive device 88 controlling the polygon mirror 78 is not adjusted, then the process direction resolution of the scanning beam is doubled. However, by utilizing two facets 80/scan lines to write one line of image data as set out above, the process direction resolution is reduced by 50% compared to using a single facet/scan line per line of image data. Thus, the process direction image resolution can be maintained when cutting the process direction speed in half by utilizing two facets 80 to write each line of image data. This is accomplished without varying the velocity of the motor 88 for driving the polygon mirror 78.

Changes in the rotational speed of the polygon mirror 78 must reach steady state before a scan line may be written to ensure that line length is properly maintained. By not having to modify the polygon mirror 78 motor velocity, the system can be conveniently and quickly modified. Moreover, the laser power does not require adjustment under such circumstances because the image time utilized to write each Pel does not change when switching between a mode of operation wherein a full speed image transfer rate and a process direction resolution realized by utilizing one facet/scan line per line of bitmap image data, is switched to a different mode of operation wherein the image transfer rate is cut to 50% of the full speed image transfer rate, and the process direction resolution is realized by utilizing two facets 80/scan lines per line of image data as described more fully herein. This feature further enables a relatively quick change in printer settings to accommodate a slower process direction print mode of operation.

For example, if the image transfer rate is reduced to one half of the full speed image transfer rate, such as by slowing down the photoconductive drum motor 90 by an appropriate amount, and leaving all other parameters the same as for the full speed image transfer rate, the effective process direction resolution is essentially double that of the process direction resolution when operating at the full speed image transfer rate. Thus, the total laser power delivered to the photoconductive surface of the drum 40 will be doubled. This is because the rotational velocity of the polygon mirror 78 and the output power of the laser source were not altered. However, by using two or more facets 80/scan lines per line of image data, the total and average photoconductor exposure energy is nominally the same at both full and one half image transfer rates. That is, the photoconductive surface "sees" the same exposure energy and scan resolution at both the full speed and half speed image transfer rates.

As yet another example, utilizing two or more facets 80 per line of image data, also referred to herein as the split facet printing approach, can be utilized to shift the printing system from a normal process direction resolution to a different process direction resolution by adjusting the manner in which image data is communicated to the laser source, and by modifying the power supplied to the corresponding laser source. The image transfer speed and the process polygon mirror 78 motor speed are not adjusted. For example, to switch from 1200 dpi in the process direction to 600 dpi in the process direction, the polygon mirror 78 velocity and the image transfer rate (process direction of the drum 40) are unchanged. However, two facets 80 are utilized to write each line of image data. The only required changes are to increase the laser power, e.g., double the laser power, and modify the timing of when the image data is communicated to the associated laser source.

Thus, the apparatus 10 may have two or more operating modes to correspond with various print requirements. For example, a first mode may comprise a normal mode of printing wherein each line of image data is written by a corresponding facet/scan line. The apparatus 10 may also have a second mode wherein each line of image data is split across two or more facets 80 as described more fully herein. To maintain approximately the same total energy delivered to the photoconductive surface when switching between the first and second modes, the laser power may be increased, e.g., doubled, when changing from the first print mode to the second print mode.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks may sometimes be executed in the reverse order, depending upon the functionality involved. It will also be noted that each block of the block diagrams and/or flowchart illustration, and combinations of blocks in the block diagrams and/or flowchart illustration, can be implemented by general or special purpose hardware and/or software based systems that perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. For example, the various aspects of the present invention may be implemented in a copier, facsimile machine, multi-function machine, or other suitable structure.

Having thus described the invention of the present application in detail and by reference to preferred embodiments thereof, it will be apparent that modifications and variations are possible without departing from the scope of the invention defined in the appended claims.

What is claimed is:

1. A method of operating an electrophotographic device comprising:

sweeping a beam emitted by a laser source across an image area of a photoconductive surface, thus defining a scan line for each sweep of said beam, each sweep of said beam comprising a first part directed to a first block of adjacent print elements on the photoconductive surface and a second part directed to a second block of adjacent print elements on the photoconductive surface, the first and second parts of said sweep of said beam are not interstitial with each other;

designating at least a first part and a second part of each line of image data corresponding to said first part and said second part of each associated sweep of said beam, respectively, across said photoconductive surface; and for each line of image data:

modulating said laser source based upon said first part of said line of image data during said corresponding first part of a first one of said associated sweeps of said beam, wherein said laser source is not modulated according to image data for said second part of said first one of said associated sweeps of said beam; and modulating said laser source based upon said second part of said line of image data during said corresponding second part of a second one of said associated sweeps of said beam, wherein said laser source is not modulated according to said image data for said first part of said second one of said associated sweeps of said beam.

2. The method according to claim 1, further comprising:

providing a rotating scanning device having a plurality of deflecting surfaces arranged such that said beam emitted by said laser source sweeps across said photoconductive surface each time a new one of said deflecting surfaces intercepts said beam;

writing said first part of said line of image data in said first sweep using a first one of said deflecting surfaces of said scanning device; and writing said second part of said line of image data in said second sweep using a second one of said deflecting surfaces of said scanning device, which is different from said first one of said deflecting surfaces.

3. The method according to claim 2, further comprising:

selecting said first one of said deflecting surfaces and said second one of said deflecting surfaces as adjacent deflecting surfaces.

4. The method according to claim 1, further comprising:

providing a rotating scanning device having a plurality of deflecting surfaces arranged such that said beam emitted by said laser source sweeps across said photoconductive surface each time a new one of said deflecting surfaces intercepts said beam;

writing said second part of said line of image data in said first sweep using a first one of said deflecting surfaces of said scanning device; and writing said first part of said line of image data in said second sweep using a second one of said deflecting surfaces of said scanning device, which is different from said first one of said deflecting surfaces.

5. The method according to claim 1, wherein designating said first and second parts further comprises:

substantially randomly selecting a step position along said line of image data;

delineating said first part of image data as data on a first side of said step position; and delineating said second part of image data as data on a second side of said step position opposite said first side.

6. The method according to claim 1, wherein:

said line of image data comprises a plurality of print elements; and designating said first and second parts further comprises:

selecting a step position along said line of image data delineating said first part from said second part so as to not occur on a boundary between an ON print element and an OFF print element;

delineating said first part of image data as data on a first side of said step position; and delineating said second part of image data as data on a second side of said step position opposite said first side.

7. The method according to claim 1, wherein designating said first and second parts further comprises:

defining a step range within an image area of said photoconductive surface having a first end and a second end;

substantially randomly selecting a step position along each line of image data delineating said first part from said second part such that said step position is a random distance in a predetermined direction from said first end towards said second end relative to an immediately previous step position; and wrapping said step position location back towards said first end if said randomly selected position would exceed said second end.

8. The method according to claim 1, farther comprising:

modifying laser control parameters to increase laser power supplied to said laser source so that exposure energy is generally consistent relative to using a single facet per line of image data.

9. The method of claim 1, further comprising selecting a step position along said line of image data delineating said first part from said second part so that said first part of said image data is on a first side of said step position and said second part of said image data is on a second side of said step position opposite said first side, wherein said step position along said line of image data is a different position along said line of image data from a step position along an adjacent line of image data.

10. The method of claim 1, further comprising selecting a step position along said line of image data delineating said first part from said second part so that said first part of said image data is on a first side of said step position and said second part of said image data is on a second side of said step position opposite said first side, wherein said step position selecting is based on image data values in said line of image data.

11. An imaging system for an electrophotographic device comprising:

a laser source;

a photoconductive surface;

a scanning device having a plurality of deflecting surfaces arranged such that a beam emitted by said laser source sweeps in a scan direction across said photoconductive surface each time a new one of said deflecting surfaces intercepts said beam; and a controller for causing said laser source to write image data to said photoconductive surface, wherein for each line of image data, said controller:

designates at least a first part and a second pad of said line of image data, corresponding to a first part and a second part of each associated sweep of said beam across said photoconductive surface, respectively, wherein for each associated sweep, said first part being directed to a first group of adjacent print elements along said photoconductive surface and said second part being directed to a second group of adjacent print elements along said photoconductive surface such that said first and second groups of print elements are not interstitial with each other;

modulates said laser source based upon said first part of said line of image data during said corresponding first part of a first one of said associated sweeps of said beam, wherein said laser source is not modulated according to said image data for a second part of said first one of said associated sweeps of said beam; and modulates said laser source based upon said second part of said line of image data during said second part of a second one of said associated sweeps of said beam, wherein said laser source is not modulated according to said image data for a first part of said second one of said associated sweeps of said beam.

12. The electrophotographic device according to claim 11, wherein said at least two deflecting surfaces comprise adjacent deflecting surfaces thus writing said single line of image data on at least two adjacent scan lines across said photoconductive surface.

13. The electrophotographic device according to claim 11, further comprising: a memory for storing image data;

wherein:

said controller divides said line of image data into at least said first part and said second part;

said controller builds a first line of modulation data in said memory wherein a first part of said first line of modulation data contains said first part of said line of image data and a second part of said line of modulation data contains laser beam off data; and said controller builds a second line of modulation data in said memory wherein a first part of said second line of modulation data contains laser beam off data and a second part of line of modulation data contains said second part of said line of image data.

14. The electrophotographic device according to claim 11, wherein said controller further comprises a random generator for substantially randomly selecting a step position along each line of image data delineating said first part from said second part.

15. The electrophotographic device according to claim 11, wherein said controller:

defines a step range within an image area of said photoconductive surface having a first end and a second end; and utilizes said random generator to substantially randomly select a step position along each line of image data delineating said first part from said second part such that said step position is a random distance in a predetermined direction from said first end towards said second end relative to an immediately previous step position, wherein said step position is wrapped back towards said first end if said randomly selected position would exceed said second end.

16. The electrophotographic device according to claim 11, wherein said scanning device comprises a polygon mirror having an even number of facets, wherein said controller is further configured for converting a line of image data to two scan lines, each scan line printing a portion of said image data, wherein a first portion of said image data is written by a scan of an even one of said facets and a second portion of said image data is written by a scan of an odd one of said facets.

17. The electrophotographic device according to claim 11, wherein said controller:

designates said first and second parts by selecting a step position along said line of image data delineating said first part from said second part so as to not occur on a boundary between an ON print element and an OFF print element;

delineates said first part of image data as data on a first side of said step position; and delineates said second part of image data as data on a second side of said step position opposite said first side.

18. The electrophotographic device of claim 11, wherein said first and second one of said associated sweeps of said beam are deflected off of different deflecting surfaces of said scanning device.

19. The electrophotographic device of claim 11, wherein the controller selects a step position along said line of image data delineating said first part from said second part so that said first part of said image data is on a first side of said step position and said second part of said image data is on a second side of said step position opposite said first side, wherein said step position along said line of image data is a different position along said line of image data from a step position along an adjacent line of image data.

* * * * *